(12) United States Patent
Jin et al.

(10) Patent No.: US 8,112,631 B2
(45) Date of Patent: Feb. 7, 2012

(54) PASSWORD INPUT DEVICE, COMPUTER SECURITY SYSTEM USING THE SAME AND METHOD THEREOF

(75) Inventors: Lei Jin, Shenzhen (CN); Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 370 days.

(21) Appl. No.: 12/491,253

(22) Filed: Jun. 25, 2009

(65) Prior Publication Data

US 2009/0328201 A1 Dec. 31, 2009

(30) Foreign Application Priority Data

Jun. 30, 2008 (CN) .......................... 2008 1 0302434

(51) Int. Cl.
*G06F 21/00* (2006.01)

(52) U.S. Cl. ............................. 713/183; 726/27; 726/28
(58) Field of Classification Search .................. 713/183; 726/27, 28
See application file for complete search history.

(56) References Cited

U.S. PATENT DOCUMENTS

2006/0149970 A1* 7/2006 Imazu ........................... 713/183
2008/0268931 A1* 10/2008 Alderucci et al. .............. 463/11

* cited by examiner

*Primary Examiner* — Christopher Brown
(74) *Attorney, Agent, or Firm* — Altis Law Group, Inc.

(57) ABSTRACT

A password input device includes a detection module, a recognition module, and an output module. The detection module is configured for detecting angular velocities and accelerations of hand movement. The recognition module includes a conversion unit, a character database, and an indexing unit. The conversion unit is configured for converting the detected angular velocities and accelerations, in analog format, into usable data. The indexing unit is configured for seeking a character corresponding to user input in the character database according to the usable data, and outputting the corresponding character. The output module is configured for receiving the corresponding characters from the indexing unit and determining the password.

8 Claims, 5 Drawing Sheets

PASSWORD INPUT DEVICE, COMPUTER SECURITY SYSTEM USING THE SAME AND METHOD THEREOF

BACKGROUND

1. Technical Field

The present disclosure relates to information security, and particularly, to a password input device, a computer security system using the same and method thereof.

2. Description of Related Art

Keypads or touch screens are frequently used for inputting user information to gain access to computer security systems. However, such devices require users to access the keypads or touch screens directly, preventing use by remote control. This is inconvenient.

Therefore, what is needed is to provide a password input device, a computer security system using the same and method thereof, in which the limitations described above, are eliminated or alleviated.

DETAILED DESCRIPTION

Figure 1:
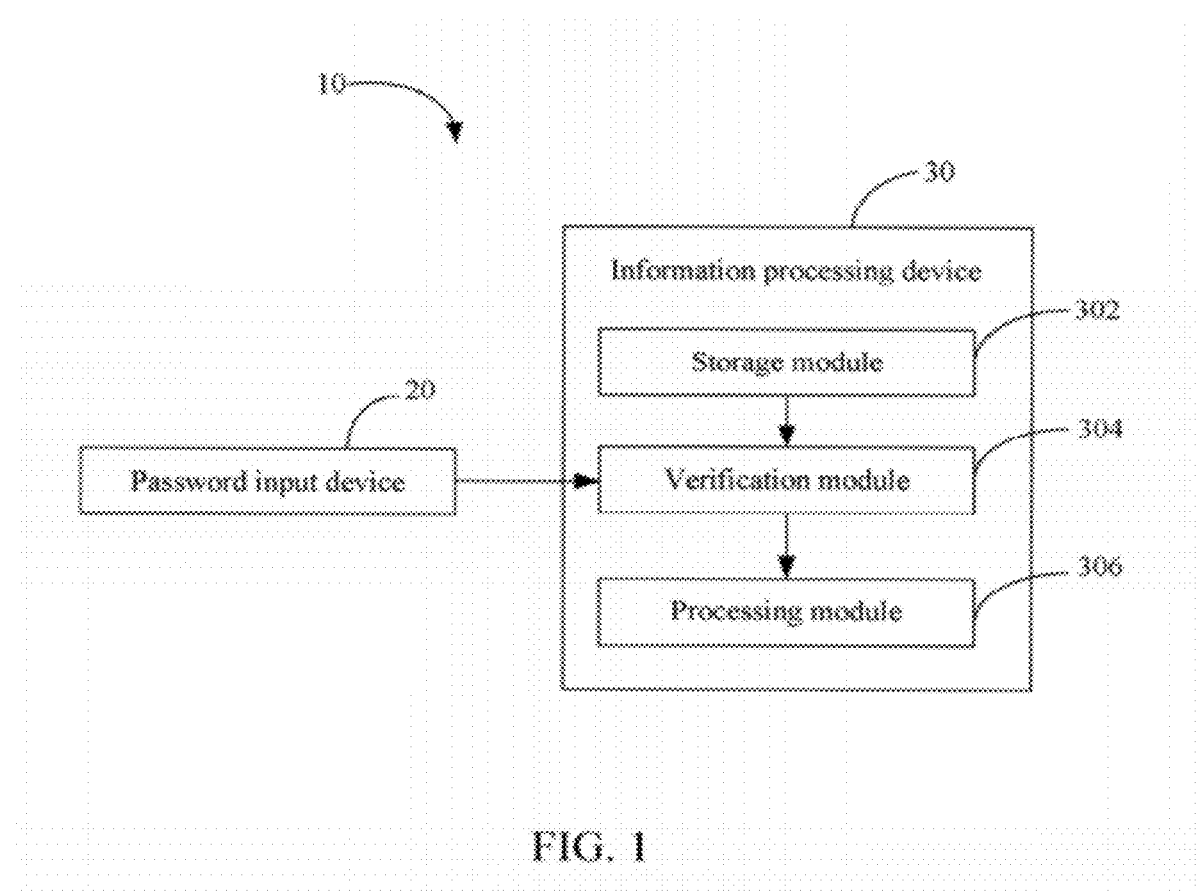
FIG. 1 is a functional block diagram of a computer security system.

Referring to FIG. 1, a computer security system 10 includes a password input device 20 and an information processing device 30.

Figure 2:
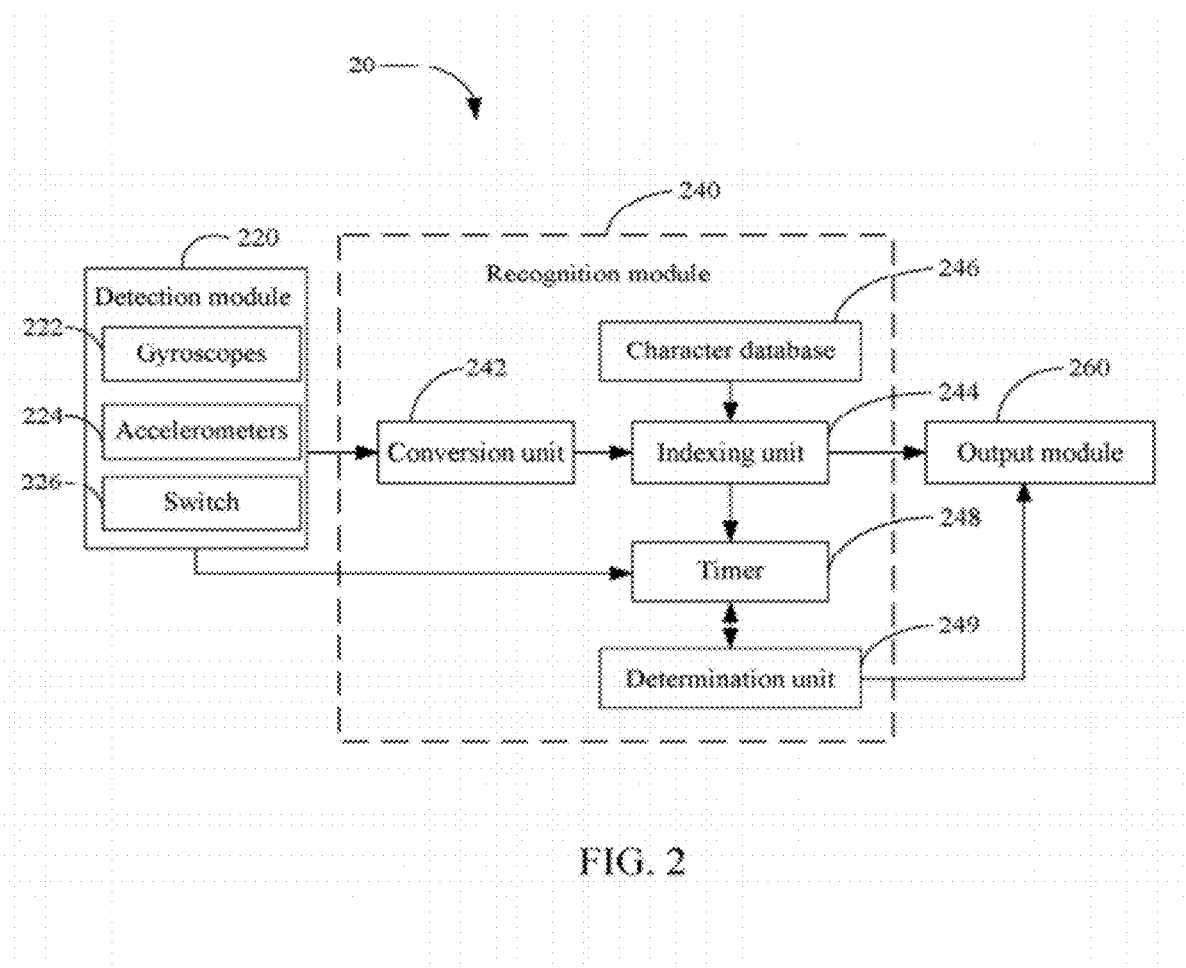
FIG. 2 is a functional block diagram of a password input device, applicable in a computer security system such as, for example, that of FIG. 1.

Referring to FIG. 2, the password input device 20 is configured for detecting user input of hand movement in the air and interpreting the user input as corresponding password characters. The password input device 20 includes a detection module 220, a recognition module 240, and an output module 260.

The detection module 220 includes necessary gyroscopes 222 and accelerometers 224 for detecting angular velocities and accelerations of the hand movement. In practice, the detection module 220 can be embodied as a ring or a stylus. The ring can be worn on a finger or the stylus is held by a hand and the motions performed. Commensurately, the gyroscopes 222 and accelerometers 224 detect angular velocities and accelerations of the user actions. In addition, the detection module 220 includes a switch 226 which can turn the detection module 220 on or off. The detection module 220 can communicate with the recognition module 240 via cables or wirelessly.

The recognition module 240 is configured for receiving the detected angular velocities and accelerations of the hand movement and converting them to corresponding password characters. Here, the recognition module 240 includes a conversion unit 242, an indexing unit 244, a character database 246, a timer 248, and a determination unit 249.

The conversion unit 242 is configured for converting the angular velocities and accelerations of the hand movement which are in analog format into usable data.

The indexing unit 244 is configured for seeking characters corresponding to user input of hand movement in the character database 246 according to the usable data. In addition, the indexing unit 244 is also configured for outputting the corresponding character to the output module 260.

The timer 248 is configured for measuring an idle interval following user input prior to subsequent user input, detected by the detection module 220.

The determination unit 249 is configured for determining whether the idle interval exceeds a predetermined minimum value, such as 5 seconds, and less than a predetermined maximum value, such as 1 minute. If so, the determination unit 249 outputs a blank character to the output module 260. If the idle interval exceeds the predetermined maximum value, the determination unit 249 determines that the user input is completed and signals the output module 260 to delete blank characters received after the most recent user input.

The output module 260 is configured for receiving corresponding characters from the indexing unit 244 and blank characters from the determination unit 249 and determining a password after the determination unit 249 determines that user input is completed. The output module 260 provides the password to the information processing device 30.

It should be mentioned that user input can also be terminated by the switch 226. For example, when the switch 226 is on, user input begins. When the switch 226 is off, user input is completed.

The information processing device 30 is configured for providing information processing services according to the password and includes a storage module 302, a verification module 304, and a processing module 306.

The storage module 302 is configured for storing an originally registered password. The verification module 304 is configured for verifying that the password is authorized. In detail, the verification module 304 compares the password with the originally registered password. If the password is the same as the originally registered password, the processing module 306 is allowed access to information processing services, such as logging into computer accounts, retrieving e-mail from servers, accessing programs, and others. Otherwise, access is denied and the processing module 306 displays a message, such as "wrong password, enter again".

Figure 3:
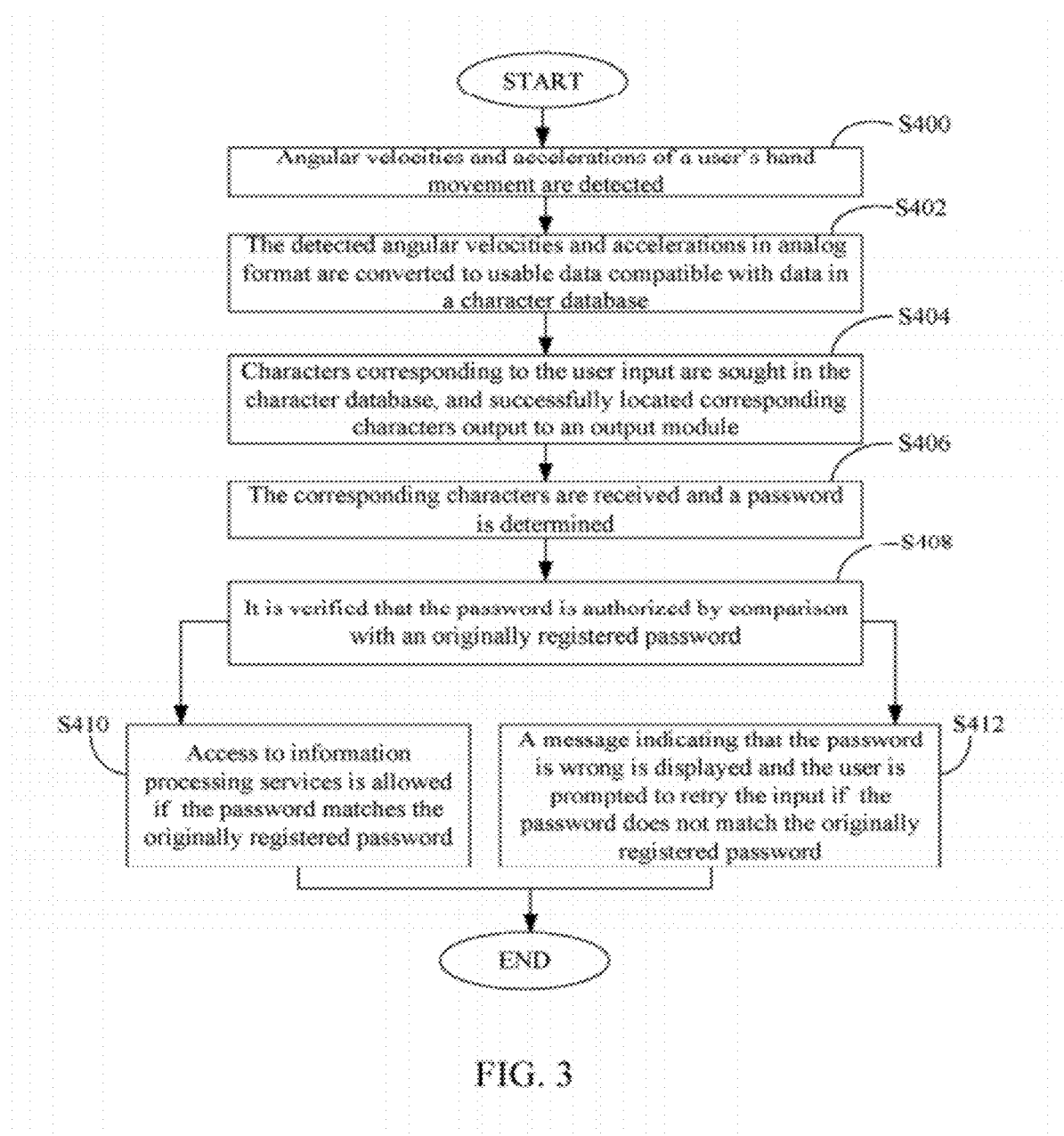
FIG. 3 is a flowchart of a first embodiment of a computer security method.
Figure 4:
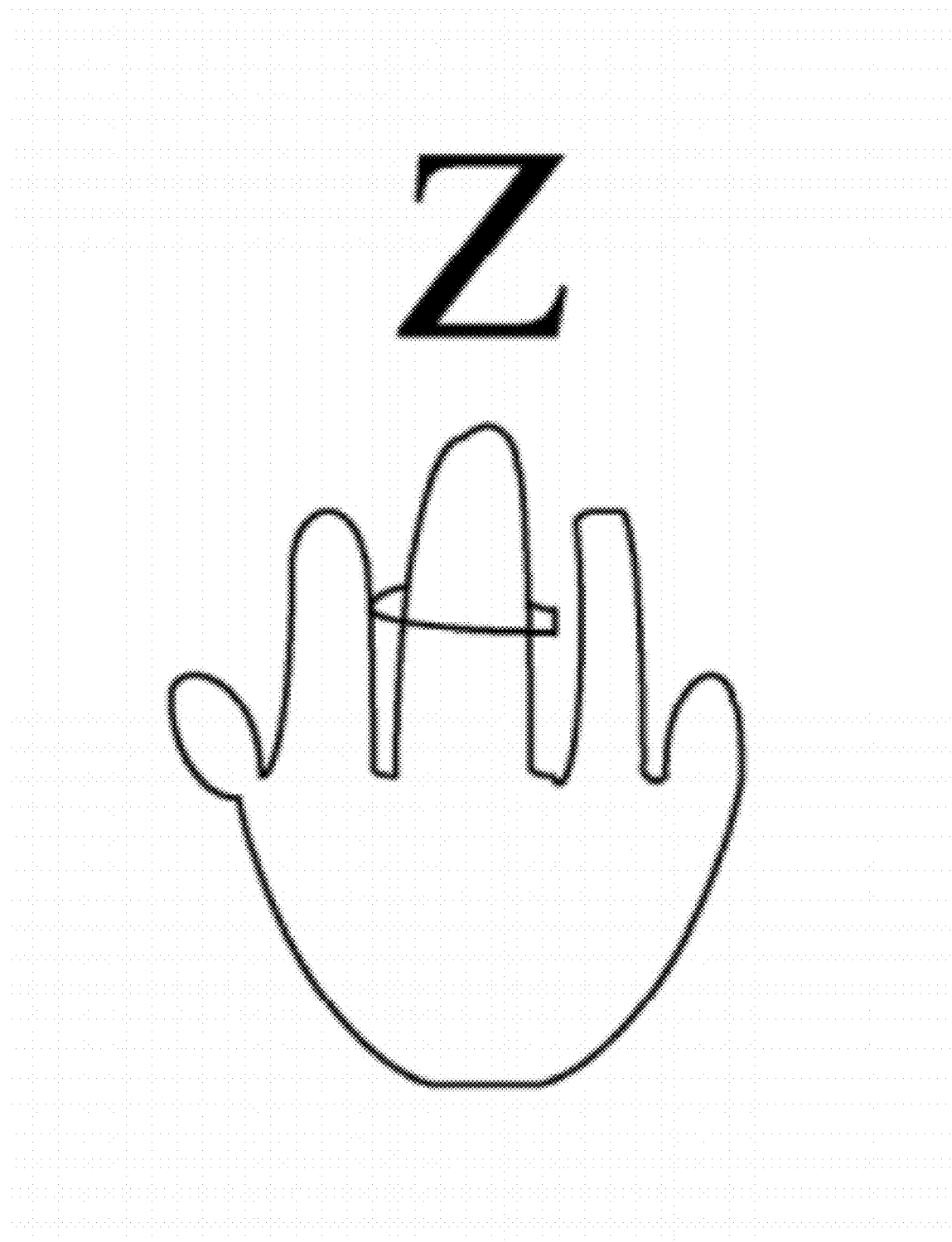
FIG. 4 is a schematic view of user input in the computer security method of FIG. 3.

Further referring to FIGS. 3-4, a first embodiment of a computer security method can be implemented by, for example, the computer security system 10 and includes the following steps.

In step S400, angular velocities and accelerations of a user's hand movement are detected. The hand movement may be alphanumeric characters. In step S402, the detected angular velocities and accelerations in analog format are converted to usable data compatible with data in a character database. In step S404, characters corresponding to the user input are sought in the character database, and successfully located corresponding characters output to an output module. In step S406, the corresponding characters are received and a password is determined. In step S408, it is verified that the password is authorized by comparison with an originally registered password. If the password matches, step S410 is implemented, in which access to information processing services is allowed. If the password does not match, step S412 is implemented, in which a message indicating that the password is wrong is displayed and the user is prompted to retry the input.

Figure 5:
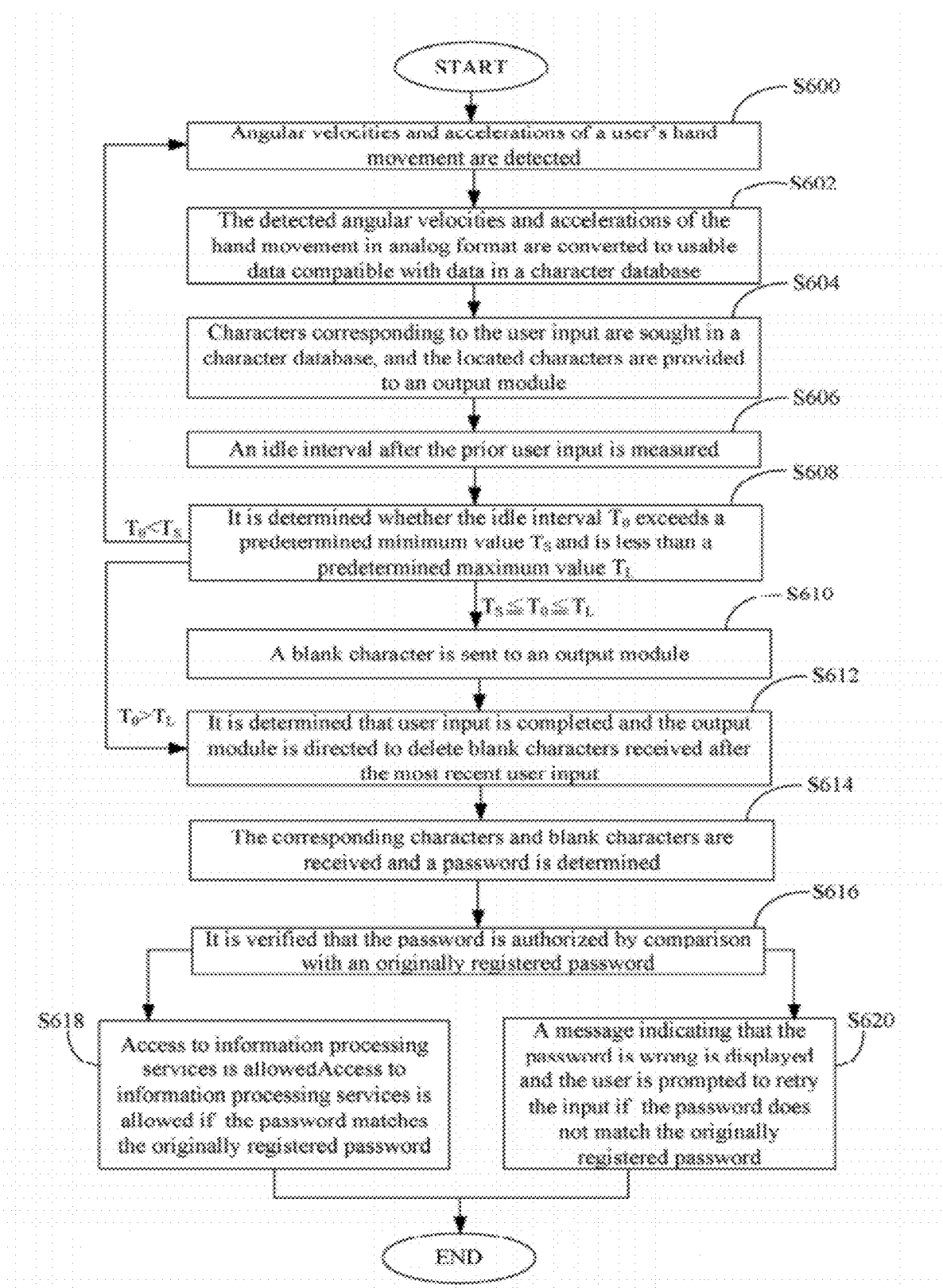
FIG. 5 is a flowchart of a second embodiment of a computer security method.

Also referring to FIG. 5, a second embodiment of a computer security method can be implemented by, for example, the computer security system 10 and includes the following steps.

In step S600, angular velocities and accelerations of a user's hand movement are detected. In step S602, the detected angular velocities and accelerations of the hand movement in analog format are converted to usable data compatible with data in a character database. In step S604, characters corresponding to the user input are sought in a character database, and the located characters are provided to an output module. In step S606, an idle interval after the prior user input is measured, with subsequent user input detected by the detection module 220 providing the end point for the interval. In step S608, it is determined whether the idle interval $T_0$ exceeds a predetermined minimum value $T_S$ and is less than a predetermined maximum value $T_L$. If $T_S \leq T_0 \leq T_L$, step S610 is implemented, in which a blank character is sent to an output module. If $T_0 < T_S$, step S600 is repeated. If $T_0 > T_L$, S612 is implemented, in which it is determined that user input is completed and the output module is directed to delete blank characters received after the most recent user input.

In step S614, the corresponding characters and blank characters are received and a password is determined. In step S616, it is verified that the password is authorized by comparison with an originally registered password. If the password matches, step S618 is implemented, in which access to information processing services is allowed. If the password does not match, step S620 is implemented, in which a message indicating that the password is wrong is displayed and the user is prompted to retry input.

Computers can receive password from user input of hand movement, avoiding the need of keypads and touch screens. Password input can be achieved by remote control. This is convenient.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A password input device comprising:
   a detection module configured for detecting angular velocities and accelerations of hand movement;
   a recognition module comprising:
      a conversion unit configured for converting the detected angular velocities and accelerations, in analog format, into usable data;
      a character database;
      an indexing unit configured for seeking a character corresponding to a user input in the character database according to the usable data and outputting the corresponding character;
      a timer configured for measuring an idle interval following user input prior to subsequent user input; if a subsequent user input is detected by the detection module, the idle interval is a time interval between the prior user input and subsequent user input; and
      a determination unit configured for determining whether the idle interval exceeds a predetermined minimum value and is less than a predetermined maximum value, if so, the determination unit outputting a blank character to the output module, if the idle interval exceeds the predetermined maximum value, the determination unit determining that user input is completed and signals the output module to delete the blank characters received after the most recent input; and
   an output module configured for receiving the corresponding characters from the indexing unit and determining the password.

2. The password input device as claimed in claim 1, wherein the detection module comprises necessary gyroscopes and accelerometers for detecting angular velocities and accelerations of the hand movement, and a switch for turning the detection module on or off.

3. A computer security system comprising:
   a password input device comprising:
      a detection module configured for detecting angular velocities and accelerations of hand movement;
      a recognition module comprising:
         a conversion unit configured for converting the detected angular velocities and accelerations in analog format into usable data;
         a character database;
         an indexing unit configured for seeking a character corresponding to user input in the character database according to the usable data and outputting the corresponding character;
         a timer configured for measuring an idle interval following user input prior to subsequent user input; if a subsequent user input is detected by the detection module, the idle interval is a time interval between the prior user input and subsequent user input; and
         a determination unit configured for determining whether the idle interval exceeds a predetermined minimum value and is less than a predetermined maximum value, if so, the determination unit outputting a blank character to the output module, if the idle interval exceeds the predetermined maximum value, the determination unit determining that user input is completed and signals the output module to delete the blank characters received after the most recent input; and
      an output module configured for receiving the corresponding characters from the indexing unit and determining the password; and
   an information processing device configured for providing information processing services according to the password.

4. The computer security system as claimed in claim 3, wherein the information processing device comprises a storage module, a verification module, and a processing module; the storage module is configured for storing an originally registered password; and the verification module is configured for verifying the password by comparison with an originally registered password; and wherein, if the password matches, the processing module provides access to information processing services, and if the password does not match, the processing module displays a message indicating that the password is wrong and prompting users to retry the input.

5. The computer security system as claimed in claim 4, wherein the detection module comprises necessary gyroscopes and accelerometers for detecting angular velocities and accelerations of hand movement, and a switch for turning the detection module on or off.

6. A computer security method for a computer security system which comprises a password input device and an information processing device, wherein the password input device comprises a detection module comprising gyroscopes and accelerometers, the method comprising:

detecting angular velocities and accelerations of hand movement using the gyroscopes and the accelerometers;

converting the detected angular velocities and accelerations, in analog format, to usable data compatible with data in a character database;

seeking a character corresponding to the user input in the character database according to the usable data and outputting the corresponding character to an output module;

measuring an idle interval after the prior user input with subsequent user input providing the end point for the interval;

determining whether the idle interval $T_0$ exceeds a predetermined minimum value $T_S$ and is less than a predetermined maximum value $T_L$; if $T_S \leq T_0 \leq T_L$, sending a blank character to an output module; $T_0 < T_S$, return to detect angular velocities and accelerations of hand movement; if $T_0 > T_L$, determining that user input is completed and deleting blank characters received after the most recent user input;

receiving the corresponding characters and blank characters and determining the password; and verifying the password by comparison with an originally registered password.

7. The computer security method as claimed in claim 6, further comprising providing access to information processing services if the password is the same as the originally registered password.

8. The computer security method as claimed in claim 7, further comprising displaying a message indicating that the password is wrong and prompting users to retry inputting the password if the password is different from the originally registered password.

* * * * *